United States Patent [19]

Bliss et al.

[11] 4,144,841
[45] Mar. 20, 1979

[54] AERATION AND FILTRATION APPARATUS

[75] Inventors: George D. Bliss; Joseph E. Kercso, both of Palo Alto; Richard J. McGuire, Fremont, all of Calif.

[73] Assignee: Syntex (U.S.A.) Inc., Palo Alto, Calif.

[21] Appl. No.: 753,021

[22] Filed: Dec. 22, 1976

Related U.S. Application Data

[63] Continuation of Ser. No. 613,372, Sep. 15, 1975, abandoned.

[51] Int. Cl.² ............................................. A01K 63/00
[52] U.S. Cl. ......................................... 119/5; 210/169
[58] Field of Search ........................ 119/3, 5; 210/169

[56] References Cited
U.S. PATENT DOCUMENTS

| | | | |
|---|---|---|---|
| 3,301,402 | 1/1967 | Falkenberg et al. | 210/169 |
| 3,662,889 | 5/1972 | Takarabe | 119/5 |
| 3,785,494 | 1/1974 | Sama | 210/169 |
| 3,841,999 | 10/1974 | Bennett et al. | 210/169 X |
| 3,891,555 | 6/1975 | Bennett et al. | 210/169 |
| 3,897,338 | 7/1975 | Bennett et al. | 210/169 |

FOREIGN PATENT DOCUMENTS 1077913  3/1960  Fed. Rep. of Germany ........... 210/169

Primary Examiner—Russell R. Kinsey
Assistant Examiner—Daniel J. Leach
Attorney, Agent, or Firm—Tom M. Moran

[57] ABSTRACT

This invention is a filtration and aeration apparatus which comprises (a) an elongated tubular member which is closed at its lower end, open at the opposite end, and provided at its lower portion with a plurality of passages which extend through the longitudinal wall of the tubular member and (b) an air delivery means for supplying air to the interior of said tubular member at a point at or slightly below the lowermost level of said passages so that the air is discharged parallel to the length of said tubular member in the interior of said tubular member. Another aspect of this invention is a unique air delivery means which comprises an air tube connected to and extending into a chamber designed to allow air to escape from said chamber through passages in the chamber walls so that the air is discharged through said chamber wall passages in a direction opposite from the direction said air is delivered to said chamber through said air tube.

13 Claims, 9 Drawing Figures

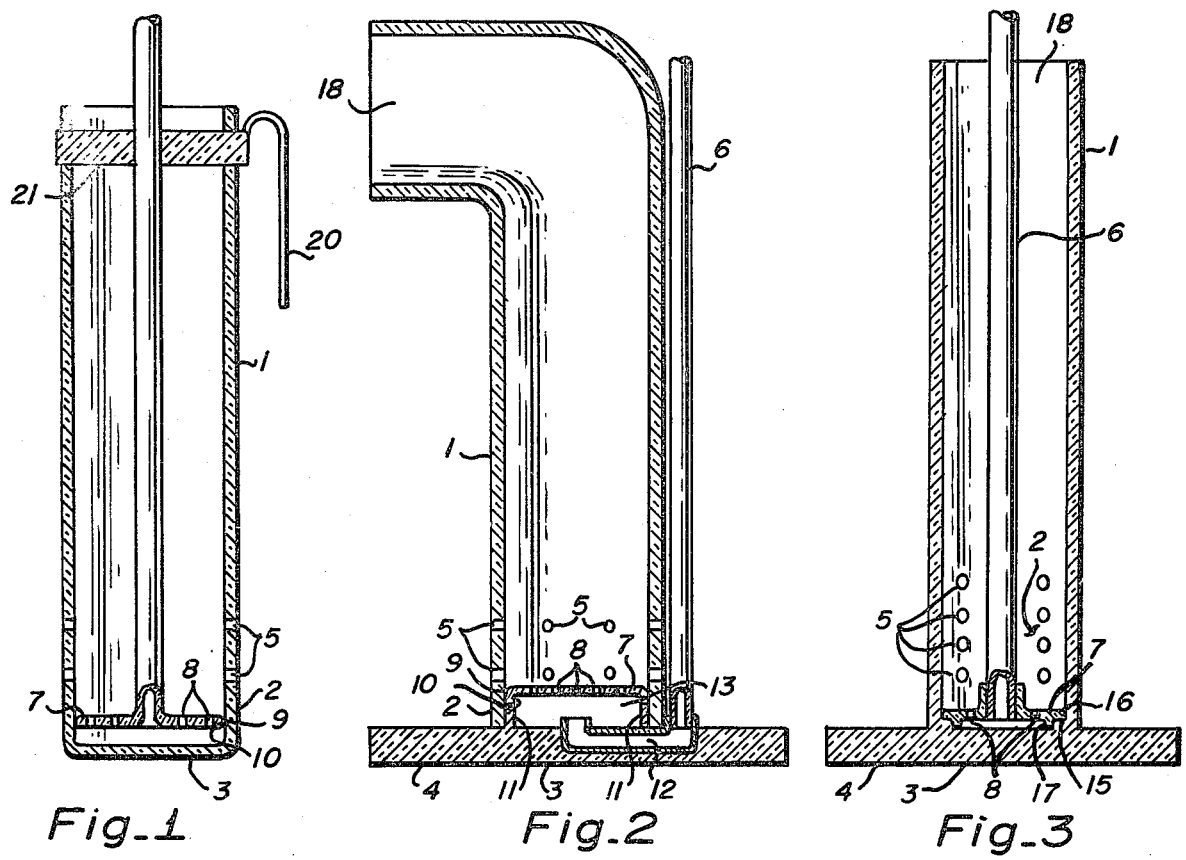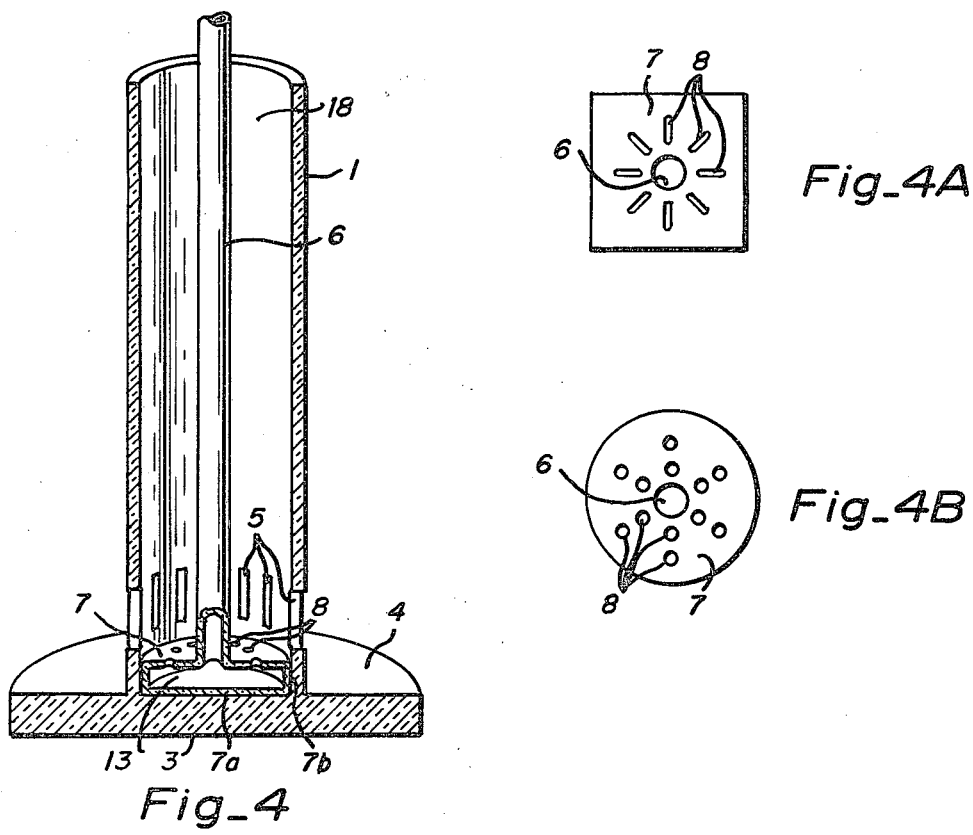

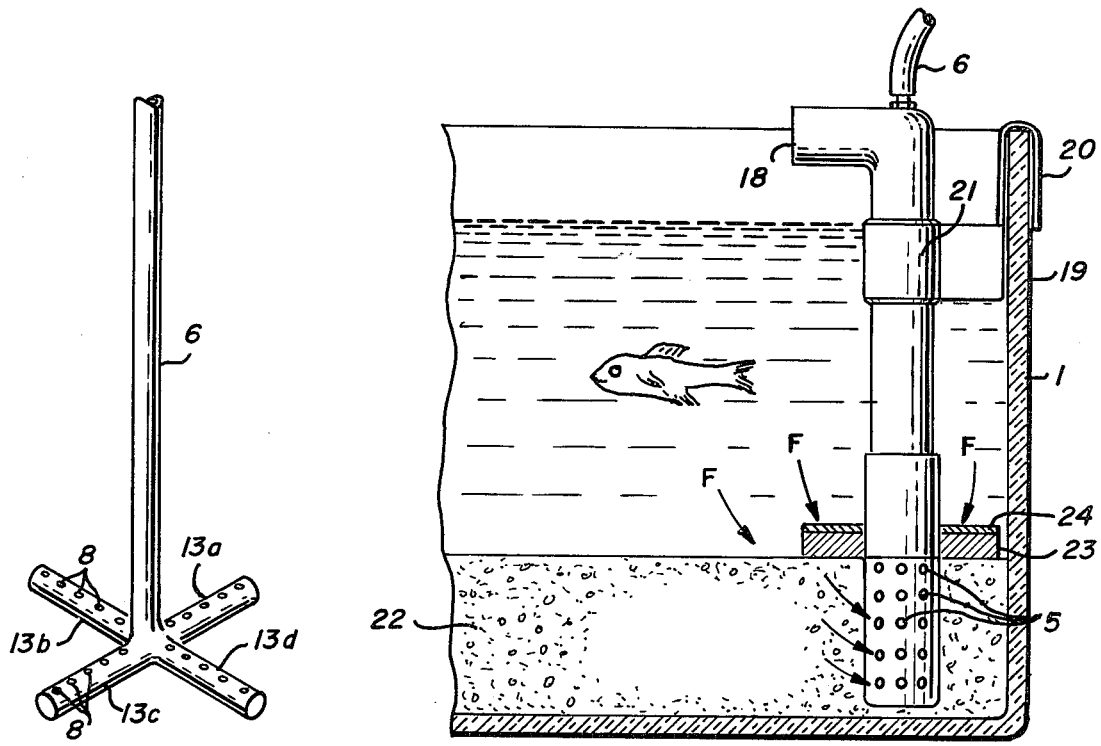
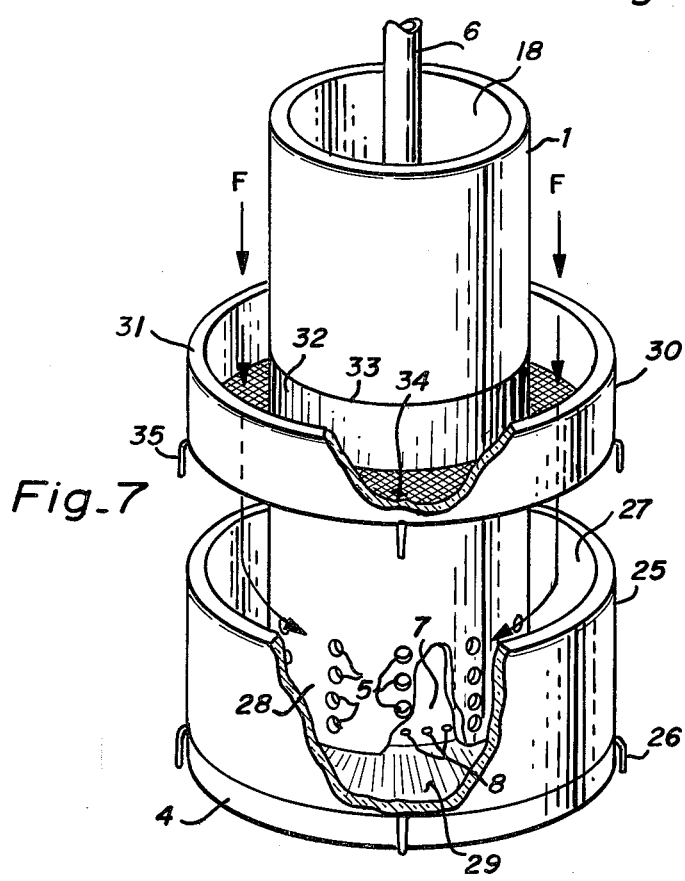

AERATION AND FILTRATION APPARATUS

This is a continuation of U.S. application Ser. No. 613,372, filed Sept. 15, 1975, now abandoned.

BACKGROUND OF THE INVENTION

1. Field Of The Invention

This invention relates to an apparatus and process for filtering, aerating and purifying liquid which is used in home or commercial aquariums. It further relates to a unique air delivery means for uniformly delivering air to a body of liquid.

2. Prior Art

Relatively small size of aquaria as compared with the natural environment for fish and other marine life, as well as the usual non-circulation of the water in the aquaria, causes the aquarium water to become contaminated with organic waste, excess food, and various organisms such as algae in a comparatively short time. These contaminants must be removed frequently to avoid accumulated pollution which is harmful to the fish or other marine life, to remove odors, and to offset cloudiness which adversely effects the clarity and aesthetic appeal of an aquarium.

Filter devices to aid in clarifying aquarium water have been proposed in the prior art which have been permanently installed as a part of the total aquarium assembly. These devices have been both interior and exterior types but have been somewhat inflexible and comparatively complicated to operate and maintain. See for example U.S. Pat. Nos. 2,730,496; 2,737,490; 3,135,238; and 2,744,065.

More recently, other simpler portable filters and aerators which may be inserted into the gravel bed of aquarium at any desired position have been suggested. See for example U.S. Pat. No. 3,897,338 issued to Bennett and Bliss on July 29, 1975. Although this device is a substantial improvement over other prior art devices, the flow rate of the aquarium liquid through the apparatus is not as great as desired at times. Surprisingly, it has now been discovered that the unique design of the apparatus of this invention can give an unexpectedly substantial increase in the rate of flow of liquid through the apparatus and thus improved aeration of the aquarium liquid. This improved aeration and circulation results in a cleaner aquarium environment and decreases the amount of time that must be spent by an aquarium owner in caring for the aquarium. Other portable aquarium filters which are known in the art include the devices set forth in U.S. Pat. No. 3,899,424 to Lake et al and U.S. Pat. No. 3,785,484 to Sama. The filter and aerator of this invention is distinguishable over these devices, however. Further, the apparatus of this invention may be used as an in-gravel type filter and aerator or it may be readily adapted to be a self-contained filter unit.

Other self-contained units for aerating and purifying the liquid in an aquarium are disclosed in U.S. Pat. No. 3,891,555 issued June 24, 1975 and U.S. Pat. No. 3,841,999 issued Oct. 15, 1974 both to Bennett and Bliss. Although these devices are substantial simplifications of previous known self-contained units they are still somewhat more complex in that they require a double aeration in the U.S. Pat. No. 3,841,999 or they require replaceable cartridges to fit inside an elongated tubular member in the U.S. Pat. No. 3,891,555.

The particularly unique design of an aquarium filter and aeration device can be employed both as a portable under gravel filter in an aquarium or as a self-contained filter unit to employ permanent or removable cartridges of filter material in situations where there is no gravel in the aquarium. The device of this invention is substantially simpler then the prior art self-contained devices and is able to maintain a greater circulation rate of the water in the aquarium, thus improving the aeration and efficiency of the aerobic bacteria which are affixed to the gravel in the aquarium.

SUMMARY OF THE INVENTION

In its simplest form, the aeration and filter apparatus of this invention comprises a. an elongated tubular member, preferably a cylinder, which is closed at one end by a substantially planar wall, open at the opposite end, and provided near the closed end with a plurality of passages which extend through the longitudinal wall of the tubular member and b. an air delivery means for supplying air to the interior of said tubular member at a point between the closed end and the wall passage closest to the closed end so that the air is discharged parallel to the length of said tubular member in the interior of said tubular member, preferably through a plurality of openings.

Preferably, the planar wall closing the one end is of larger diameter than said tubular member to thereby provide a base supporting means for said apparatus.

A particularly valuable aspect is where the air delivery means is in the interior of said elongated tubular member comprises (i) an air tube connected to and extending into (ii) a chamber designed to allow air to escape from said chamber through passages in the chamber walls so that the air is discharged through said chamber wall passages in a direction opposite from the direction the air is delivered to the chamber through the air tube. Preferably the air delivery means is removable from the filter apparatus and comprises an air tube which leads to a chamber defined by (i) an upper substantially planar wall larger than the diameter of the cross-section of the air tube and substantially perpendicular to the length thereof, (ii) a side wall extending substantially perpendicularly downward from the upper planar wall and integral therewith, and (iii) a lower, substantially planar wall parallel to the upper wall and integral with the side wall, the upper wall having passages extending therethrough so that when air is delivered through the air tube in a downward direction to the chamber, the air is released from said chamber through the passages in an upward direction.

The apparatus may be readily modified to be a self-contained filter device which includes an annular cartridge comprising (i) an outer wall concentric with the tubular member and being of a height slightly greater than the uppermost passage extending through the wall of tubular member and (ii) an annular space defined by a bottom wall extending between the outer wall and the wall of the elongated tubular member, positioned at the closed end of the tubular member, and extending perpendicular to the length of said tubular member capable of retaining a filter medium therein. Other modifications may be made such as additional filter cartridges positioned in cooperation with the first cartridge as discussed hereafter.

The process of this invention is carried out by placing the in-gravel device described above in the gravel of an aquarium so that the gravel covers the uppermost passages extending through the tubular member's wall and passing air through the air delivery means. This circulates and aerates the liquid in the aquarium. The gravel, of course, preferably has aerobic bacteria affixed thereto so that ammonia and nitrites are converted to nitrates which are used by the plants as nutrients. If a self-contained filter apparatus of this invention is employed, gravel having aerobic bacteria affixed thereto is placed in the cartridge surrounding the tubular member to height at least as high as the uppermost wall passage, the self contained filter apparatus is placed in the aquarium liquid, and air is delivered through the air delivery means to the interior of the tubular member so that the liquid is circulated through the gravel into the interior of the apparatus and out again.

BRIEF DESCRIPTION OF THE DRAWINGS

FIG. 1 is a cross section of an apparatus according to this invention to be employed under the gravel in an aquarium and attached to the side thereof.

FIG. 2 is a cross section of another aspect of this invention wherein the apparatus is free standing.

FIG. 3 is a perspective cross section of a preferred aspect of the apparatus of this invention wherein the air delivery means is removable.

FIG. 4 is a perspective cross-section of a preferred removable air delivery means in an apparatus of this invention.

FIGS. 4A and 4B are top views of suitable patterns of air passages for the air delivery means of FIG. 4.

FIG. 5 is a perspective view of another air delivery means useful in the apparatus of this invention.

FIG. 6 is a perspective representation of the apparatus of this invention in operation in an aquarium.

FIG. 7 is a partial cut-away cross section perspective of the apparatus of this invention which is equipped with removable cartridges.

PREFERRED EMBODIMENTS

The apparatus of this invention is premised at least in part on the discovery that improved circulation and aeration of water in an aquarium or aquaculture system can be obtained by employing a device which comprises (a) an elongated tubular member which is closed at its lower end, open at the opposite end and provided at its lower portion with a plurality of passages which extend through the wall of the tubular member and (b) an air delivery means for supplying air to the interior of the tubular member at a point at or slightly below the lowermost level of said passages so that air is discharged parallel to the length of the tube in an upward direction in the interior of said tubular member. One unique aspect of the apparatus which distinguishes it from the prior art and contributes to the superior results is the placement of the air delivery means to discharge the air parallel to the length of the tubular member and in an upward direction at a point below the lowermost wall passages. The prior art devices on the other hand discharged the air either perpendicular to the length of the tube or in a downward direction and at a point above the uppermost passage.

Because of the unique combination of elements, a greater flow rate through the appparatus is obtained than could be obtained with the prior art equipment which in some cases is both more cumbersome and requires greater pump input. Also, because of the compact size of the apparatus of this invention, it lends itself to easy placement in any part of an aquarium. Further, it is readily adapted to utilize removable filter pads to assist in maintaining the clarity of the aquarium water.

The apparatus of this invention can be more readily explained by referring to FIGS. 1 through 7 where the same numerals refer to the same pieces of apparatus. The apparatus may be used alone or in combination with other similar devices for maintaining the purity of the water in home or commercial aquaria of from $\frac{1}{2}$-100 gallons and may be adapted for use in larger aquaculture systems if desired. The apparatus is useful for both saltwater and fresh water aquaria.

The apparatus of this invention includes an upright fountain tube which is an elongated tubular member 1 which may be straight as indicated in FIGS. 1 and 3 or may have a bent configuration as shown in FIG. 2. The horizontal cross section of the tubular member may be circular or polygonal such as a square, rectangle, triangle or the like. Thus the tubular member can be a polyhedron such as an elongated box or, preferably, is a cylinder. Whatever the ultimate configuration is, the tubular member is substantially the same cross-sectional area throughout the entire length of the tube. The tubular member may be made of any suitable, non-toxic material such as non-corrodable metal, e.g. aluminum, stainless steel, and the like; wood; glass; ceramic; or preferably plastic, e.g. polyethylene, polypropylene, polyvinyl chloride, and the like. The tube may be opaque or transparent. If the device is designed for small aquaria, the internal diameter of the tubular member may be anywhere from about $\frac{1}{2}$ to about 2 inches and about 4 inches to about 12 inches long, depending on the depth of the water in the aquarium used. The dimensions may be greater for larger aquaculture systems. A particularly valuable configuration is a cylinder about 6 inches in length with an inside diameter of about $\frac{7}{8}$ inch.

The lower portion 2 of tubular member 1 is closed by a substantially planar base plate 3, thus defining an interior chamber surrounded by the longitudinal wall (or walls if a polyhedron) of the tube and the base plate 3, but open at the upper end 18 of the tubular member. The plate may be substantially the same diameter as the tubular member as shown in FIG. 1 or may be of greater diameter, having a portion 4 extending beyond the diameter of the tubular member 1 to thereby provide a base stablizing means for the device to assist in holding the apparatus in an upright position. Preferably the plate closing the lower portion of the tubular member will be of greater diameter than the tubular member so that the apparatus may be set in an aquarium with a certain degree of stability. In the absence of such a base, the device may be fastened to the side of the aquarium by any simple fastening means such as a hook 20 attached to band 21 encircling tube 1 as shown in FIG. 1. The plate closing the lower end of the tubular member may be an integral part of tubular member or may be a slip-fit cap, a screw-on cap, or a snap-on cap.

The combination of the base plate with the tubular member is preferably rigid enough to thrust into the gravel which may cover the bottom of an aquarium so that the tubular member is retained in a substantially vertical position.

Extending through the walls of the tubular member 1 and located at the lower portion are a number of passages 5 through which water surrounding the apparatus can enter the interior of the tubular member 1. These passages are preferably located around the circumference of the tube 1 and are of a size sufficient to prevent gravel which may sit in the bottom of an aquarium from entering the interior of the tube 1 while at the same time allowing the water to flow through the passages. The passages may be of any configuration such as slits, circles, squares, and the like. The diameter of the passages will depend on the gravel size, but generally may be about 1/16 to ½ inches, preferably about 1/16 to ¼ inch, e.g. 1/10 inch. The passages may extend around the circumference of the tube 1 in one row or in a plurality of rows and extend up to about ½ the length of the tubular member, preferably the uppermost passage will be no higher than about ¼ the length of tube 1 and a 6 inch apparatus should extend no higher than about 1–1½ inches. The distribution of the passages may be such that the passages are directly across from each other or they may be equal distance between each passage in any one row. If the tubular member is in cross-section a square and is designed to rest in the corner of the aquarium, the passages may be located only on two sides of the tubular member not adjacent the aquarium walls. To obtain the maximum flow of water into the tube 1 and out again by operation of the air lift mechanism, the total cross-sectional area of the passages should be about equal to the total cross-sectional area of the tubular member 1.

In combination with the elongated tubular member and plate is an air delivery means which in FIGS. 1, 2, 3 and 4 is shown as an air tube 6, which is preferably rigid, for supplying air from an external source, not shown, to the lower portion of the tubular member 1. The air tube may be inside fountain tube 1 as shown in FIGS. 1 and 3 or external as in FIG. 2. The air delivery means is designed so that air is discharged vertically and parallel to the length of the tube 1 from a level at or slightly below the lowermost passage 5. Although this may be accomplished merely by directing air from air line 6 in an upwardly direction, this means is shown in the figures as a chamber 13, 13a, 13b, 13c, 13d located below the lowermost passage 5 and having air passage means for releasing air in the desired direction. In FIGS. 1–3, the chamber is defined on the upper side by a plate or disc 7 being larger in horizontal cross section than the air tube 6 and having a series of passages 8 through the surface of disc 7 so that the air supplied below the disc escapes through the passages 8 in a vertical direction carrying along with it a certain amount of water which then is replaced at the interior of the lower portion of the tubular member by the water outside the apparatus coming in through passages 5. The disc may be flexible or, preferably, rigid, and may be an integral part of air tube 6 as shown in FIGS. 1 and 3 or may be an integral part of the elongated tubular member as shown in FIG. 2.

In FIG. 1 the disc is about the same diameter as the interior of the elongated member 1 so that the outer edge 10 of the disc 7 fits snugly with the inner surface 9 of the lower portion of the tubular member thus forming a substantially air-tight fitting so that the air when supplied below the disc will exit from the hollow area below the disc through air passages 8 in a uniform manner. The passages 8 will have a diameter of about 1/32 to about ⅛ inch.

FIG. 2 shows a representative device of this invention wherein the disc 7 is integrated into the structure of elongated tubular member 1 and air tube 6 is external to tubular member 1. Here extending upwardly from base 3 is an annular lip 11 which is about the same outer diameter as the inner diameter of elongated tubular member 1. It is designed so that tubular member 1 may be snugly fitted around said lip so that the two are securely fastened together. Thus lip 11 may have threads which may fit into corresponding threads on tubular member 1 so that the two parts can be screwed together. Alternatively the fit may merely be friction fit wherein the tubular member 1 is forced onto the lip 11 to snugly hold the two together. Air delivery tube 6 is snugly connected to passageway 12 which extends through the base 3 of the device. This allows air to enter the hollow space or chamber 13 under disc 7 and escape through passages 8 to the interior of elongated tubular member 1.

Disc 7 is designed so that the outer edge 10 of disc 7 fits in snug contact with the inner surface 9 of the lower portion of elongated tubular member 1. The disc 7 may be a separate portion which is forced into elongated tubular member 1 so that it is permanently or removably wedged in frictional fit with the inner surface 9 of the lower portion of tubular member 1. Alternatively it may be molded into the structure of the tubular member 1 and be a permanent portion thereof.

A particulary useful design and therefore preferred is shown in FIG. 3. Here air delivery tube 6 and disc 7 are an integral unit, air tube passing through the center of the disc, the disc having passages 8 located uniformly about the surface of the disc shown as a concentric row of circular holes. The diameter of disc 7 is slightly less than the inside diameter of elongated tubular member 1 so that the disc and air tube may be removed from the tubular member as desired. Disc 7 is designed so that air is discharged through the passages 8 which extend through said disc without passing between the edge of the disc 10 and the inner surface 9 of the lower portion of tubular member 1.

As shown in FIG. 3, elongated tubular member 1 is closed by base 3 which extends beyond the outside wall of the tubular member so that extending portion 4 assists in the stabilization of the device in an aquarium. Extending upwardly from base 3 is an annular shoulder 15 which not only extends upwardly from the base but is integrated into the inner surface of the lower portion of the inside of elongated tubular member 1. Extending downwardly from the under surface of disc 7 is an annular ring 17 which has the same outer diameter as the inner diameter formed by annular shoulder 15. The downwardly extending ring 17 which is an integral part of disc 7 then fits snugly upon shoulder 15 to form a substantially air tight fit in the interior of elongated tubular member 1.

Another even more preferred configuration of an air delivery means is shown in FIG. 4. Here, air delivery tube 6 communicates with a chamber 13. The chamber is defined by an upper substantially planar plate or wall 7 which is, of course, large in horizontal cross section than the air tube and is substantially perpendicular to the length of the air tube which extends through wall 7. The upper plate or wall 7 is shown to be flat but also may be slightly concave or convex and, as discussed previously has a series of passages 8 extending therethrough. The passages may be slits or holes and are preferably uniformly distributed across the surface of the upper disc. They may take any design, some of which are shown in FIGS. 4A and 4B as top views of the air delivery means.

The chamber 13 is further defined by side wall 7b which is integral with and extending downwardly from the top wall or plate 7. In FIG. 4, side wall 7b extends downwardly from the outer circumference of wall 7 to form an annular wall which is integral with a lower planar wall 7a which is itself substantially parallel to upper plate 7. Thus, when air is delivered downwardly through air tube 6 to chamber 13, the air is discharged from chamber 13 through passages 8 in an upward (i.e. vertical) direction.

Still another configuration of an air delivery means is depicted in FIG. 5 wherein air tube 6 leads to chambers 13a, 13b, 13c, 13d which are shown as being closed-end cyclinders integral with air tube 6 and having passages 8 along the upper side of each cylinder so that air, when delivered to the chambers 13a-13d through air tube 6, is discharged in a vertical direction. Other configurations which may be apparent to one of ordinary skill in the art may also be employed in the air delivery means. This includes concentric rings, spirals, and the like.

In operation, the device is placed in an aquarium 19 in FIG. 6 in a manner so that the open end 18 is above the closed end and the uppermost passage 5 is below the level of "gravel" 22 in aquarium 19. Air is delivered through air tube 6 to underside of disc 7 whence it escapes through passages 8 into the interior of elongated tubular means 1. The air rises through the tubular means 1 in a series of uniform air bubbles and in so doing forces a certain amount of the water present on the interior of tubular means 1 up the tube and through the open end of the tube at 18. As water is forced up the tube and out open end 18 of tubular member 1 additional water rushes in through passages 5 as shown by flow arrows F to the interior of tubular member 1 and likewise is circulated upwardly. As water rushes in through the passages it passes through the gravel surrounding the exterior of tubular member 1, the gravel acts as a particle filter as well as biological filter, there being aerobic bacteria living on the surface of the gravel.

The "gravel" provides the habitat for at least aerobic bacteria, primarily nitrosomonas bacteria which convert ammonia to nitrite and nitrobacter bacteria which convert nitrite to nitrates. Since these bacteria must have their nutrients and oxygen delivered to them and require greater amounts of oxygen as ammonia builds up, the greater circulation rates and efficient aeration obtained by the apparatus of this invention aid in the efficient operation of the bacteria. The "gravel" can be any hard, non-absorptive aggregate which are individually larger in size than the passages 5 through elongated tubular member 1 and includes dolomite, ceramic, quartz, and the like. Thus if the passages are about one-tenth of an inch wide, the smallest pieces of aggregate should be about one-eighth inch in diameter or more. Preferably the aggregate will be spread on the aquarium floor to a depth sufficient to reach about one-half inch above the uppermost row of holes 5. An overlay of larger pebbles will be placed on top of the smaller aggregate to prevent fish from digging into the aggregate to disturb the efficient functioning of the bacteria.

To more efficiently filter out particulate matter from the aquarium, a filter pad 23 which is an annular ring of appropriate filter material such as cotton, dacron, nylon, etc. webbing which fits over tubular member 1 and on top of gravel 22. Since the flow of water through the gravel is downward around the tubular member 1 as shown by flow F, a certain amount of particulate matter will collect on the pad. The pad may be readily removed merely by lifting the pad off the gravel and a new pad placed down. Preferably a heavy foraminous annular ring 24 is placed on pad 23 to keep the pad in place and prevent fish from digging into the pad and dislodging particulate matter. The circulating water, at least in part, will pass through foraminous annular ring 24, the annular filter pad, and the gravel to passages 5 and the interior of tubular member 1.

The water passing up the interior of tubular member 1 is thoroughly aerated and saturated with oxygen so that as it passes out the open end 18 it is allowed to recirculate back into the aquarium and contacts the bacteria living on the gravel. Since the bacteria are aerobic the increased oxygen content of the water aids in maintaining high aerobic activity of the bacteria on the gravel. Thus the water in the aquarium is constantly circulated through the aerating and filtering device or "turned over" to maintain a high level of oxygen in the water and thus a high bacteria count in the gravel in the filter below. The solid particles eventually decompose into nitrogenous material which is degraded by the bacteria so that it breaks down into nitrites and further down into nitrates which may be used by the plants in the aquarium for nutrients. Although the device as described thus far is designed to be used in an aquarium or aquaculture system as represented by FIG. 6 which comprises a container 19 having an amount of gravel 22 at the bottom of said container sufficient to cover the exterior of the lower portion of tubular member 1 to a height sufficient to cover the uppermost passage 5, the device can be modified to be used in an aquarium system which does not have sufficient gravel to reach all the way to cover substantially all the passages. The device may be modified as shown in FIG. 7.

In FIG. 7 a partial cut-a-way, perspective view of the basic device and additional modifications can be seen. The elongated tubular member again is shown as 1 while air is delivered to the interior of said elongated tubular member by air tube 6 below disc 7 and is released through passages 8. Water surrounding the device enters the interior of elongated tubular member through passages 5. The device is modified by defining an annular space 27 by an outer wall 25 concentric with and spaced from the wall of the elongated tubular member 1 and having a bottom portion extending between the two walls and substantially perpendicular thereto so that aggregate may be contained in the annular space. Outer wall must be at least as high as the uppermost passage 5 in elongated tubular member 1 and preferably slightly higher. The outer wall may be of solid construction as shown in FIG. 5 or it may be of foraminous construction which allows water to flow through the wall and through passages 5. Whichever construction it is it must be sufficient to retain in the annular space 27 a filter medium, preferably one upon which aerobic bacteria can grow. This medium can be any suitable, hard, non-porous stones, gravel, or dolomite which is generally used as gravel for the bottom of aquariums as discussed hereinbefore.

The outer wall 25 may be integrated into the base 4 or may be attached to base 4 by means of a suitable attaching mechanism such as extension clips 26 as shown in the diagram or by screwing or snapping on. Alternatively the inner surface of the wall 25 may snugly fit in conjunction with the outer surface of base 4 to form a substantially water tight fit which is sufficient to retain the gravel within the annular space 27.

Alternatively annular space 27 may be defined by the combination of outer wall 25 and inner wall 28 which are attached by bottom wall 29. In this case base portion 4 may not be needed. If this construction is utilized, inner wall 28 must be of material sufficient to allow water to pass therethrough while retaining the gravel within the annular space 27. This may be a flexible or rigid foraminous plastic such as polyethylene or polypropylene or other suitable non-toxic material such as a non-toxic metal screen. The wall 28 must fit snugly with the outer surface of elongated tubular member 1 so that water does not flow between the inner surface of wall 28 and the outer surface of tubular member 1. Bottom wall 29 may be of substantially solid material or may be of a foraminous material, but must be sufficient to retain the medium which is used to fill the annular space 27. Thus, once the annular space 27 is filled with the proper medium an annular cartridge is formed which may be kept in contact with the elongated tubular member 1 or may be removed as desired, for example to clean any particles which may collect in the cartridge. If this design is used it must be born in mind that the water must travel through the medium having the aerobic bacteria thereon and then through the passages 5 to the interior of the elongated tubular member 1 and hence up the tubular member and out the open end 18 to be redistributed through the aquarium and recirculated back through the medium in the annular space 27. By this particular configuration of the apparatus the necessity of having an aquarium with a sufficient amount of gravel in the bottom is obviated.

In addition to the cartridge biological filter which can be employed with the apparatus of this invention, other filters may also be employed, for example an annular ring of ordinary filter material such as a pad of glass wool, dacron, cotton or the like which is generally available in the art may be placed over the top of the biological filter held in annular space 27 to filter out any particles which may otherwise clog the biological filter. This particle filter may be readily removed as necessary. In this case wall 25 must be of solid material to assure that the flow of water is first through the particle filter then through the gravel in annular portion 27. If such annular particle filter pad is employed, an annular cover of foraminous plastic metal ceramic, or the like is placed over the particle filter pad to keep the pad in place and prevent fish from digging into the pad and stirring up the particles collected on the pad.

In some cases it may be preferable to use an additional annular cartridge shown as 30 in FIG. 7. Generally this cartridge will consist of an outer wall 31, an inner wall 32 and a bottom wall 34 interconnecting the two. Preferably the outer wall 25 of the lower cartridge as well as the outer wall 31 of the upper cartridge will be of solid material so that the water will be forced to flow downwardly as shown by flow arrows F through the material in the interior of cartridge 30 into the annular space 27 where the biological filter material is kept and to the interior of elongated tubular member 1 through passages 5. The bottom wall 34 must be of foraminous material which allows water to flow therethrough but which is sufficient to retain the filter medium within the cartridge annulus 30. Preferably the cartridge will be made of non-toxic plastic material such as polyethylene or polypropylene. The inner wall 33 must fit snugly with the outer wall of elongated tubular member 1 so that no water can flow between the inner surface of wall 32 and the outer surface of tubular member 1. Such a water flow is easily prevented by employing an annular tubular rubber ring 33 which fits snugly in contact with the outer surface of the elongated tubular member 1, the ring being an integral part of the upper portion of inner wall 32. Cartridge 30 must fit in substantially water tight relation with the upper wall surface of 25, so that no water flows between the two cartridges. If a substantial amount of water were allowed to flow between the cartridges maximum advantage would not be made of the filtering means in cartridge 30. A snug fit can be obtained by employing extension clips 35 or by designing cartridge 30 so that the inner surface of outer wall 31 fits snugly about the outer surface of outer wall 25 thus preventing inflow of any water between the two surfaces. Such a result may be accomplished by threading the upper portion of 25 and the lower inner portion of 31 so that cartridge 30 can be screwed onto outer wall 25. Alternatively it may merely be a frictional fit which can be pushed on.

A plurality of the cartridges 30 can be employed each one having a different filtering means. For example one cartridge may have aquarium wool used to filter out particles from the water flowing to the interior of elongated tubular member 1, another cartridge may have a toxic material filter such as charcoal retained therein, while still another may have a slow release medicament retained therein if the animal in the aquarium is to be treated for diseases.

Other alterations of the apparatus of this invention may be apparent to one of skill in the art and these alterations are meant to be included within the scope of the claims appended hereto.

Thus, it can be seen from the above discussion that another aspect of this invention is a process for filtering and aerating liquid in a container having a depth of gravel at the bottom of the container. In essence, the process comprises a. placing the gravel the lower end of a device comprising (i) an elongated tubular member which is closed at its lower end, open at the opposite end and provided at its lower portion with a plurality of passages through the wall of the tubular member and (ii) an air delivery means for supplying air to the interior of said tubular member at a point at or slightly below the lowermost level of said passages so that the gravel (which preferably has aerobic bacteria such as nitrosamonous and nitrobacter bacteria thereon) covers substantially all of the passages, and b. passing air through the air delivery means so that the air is discharged parallel to the length of the tubular member in an upward direction to circulate water up said tubular member while it is aerated and water outside said tubular member passes through said gravel and said passages to the interior of said tubular member.

Another aspect of this invention comprises a process of filtering and aerating liquid in a container by a. placing in said liquid a device which comprises (i) an elongated tubular member which is closed at its lower end, open at the opposite end, and provided at its lower portion with a plurality of passages through the wall of the tubular member, (ii) an air delivery means for supplying air to the interior of said tubular member at a point at or slightly below the lowermost level of said passages so that the air is discharged parallel to the length of said tubular member and in an upward direction, (iii) an annular space defined by an outer wall spaced from and concentric with the wall of the tubular member and a bottom wall extending between the two concentric walls, perpendicular to each, and extending outward from the closed end of the tubular member, which thereby provides a base supporting means for said apparatus, said outer wall fitting around the circumference of said bottom wall, being about as high as said uppermost passages, and being snugly engaged with said bottom wall so that gravel may be retained in said annular space;

placing a gravel (preferably having aerobic bacteria thereon) in the annular space to a height sufficient to cover the uppermost passage through said tubular member wall, and passing air through said air delivery means so that said liquid circulates up the elongated tubular member and in through said gravel in the annulus and through the passages to the interior of the elongated tubular member.

We claim as our invention:

1. A filtration and aeration apparatus which comprises
   a. an elongated tubular member which is closed at its lower end, open at the opposite end, and provided solely at its lower portion with a plurality of passages which extend through the longitudinal wall of the tubular member and
   b. an air delivery means for supplying air to the interior of said tubular member at a level at or slightly below the lowermost of said passages so that the air is discharged in the interior of said tubular member parallel to the length of said tubular member and in an upward direction, wherein said air delivery means comprises (i) an air tube connected to and extending into (ii) a chamber designed to allow air to escape from said chamber through passages in the chamber wall so that the air is discharged through said chamber wall passages in a direction opposite from the direction said air is delivered to said chamber through said air tube.

2. The apparatus of claim 1 wherein the lower end of said tubular member is closed with a substantially planar wall perpendicular to said elongated tubular member and of larger diameter than said tubular member to thereby provide a base stabilizing means for said apparatus.

3. The apparatus of claim 1 wherein said air tube is a rigid air tube inside said tubular member extending the length of said tubular member and being concentric therewith, and said chamber is defined by a disc through which the lower portion of said air tube passes, said disc having the same configuration as the cross-section of said tubular member, having a diameter slightly less than the inside diameter of said tubular member, having air passages distributed uniformly across the surface thereof, and being designed so that air which is delivered through said air tube below said disc is discharged in a vertical direction through said air passages without passing between the outer edge of said disc and the inner surface of the lower portion of said elongated tubular member; said disc being placed below the lowermost passage in said tubular member but spaced from the closed, lower end of said elongated tubular member.

4. The apparatus of claim 1 which includes around the lower portion of said tubular member an annular space defined by
   (i) an outer wall concentric with and spaced from said tubular member and being of a height slightly greater than the uppermost passage extending through said tubular member and
   (ii) a bottom wall extending between said outer wall and elongated tubular member so that a hard, non-porous aggregate may be retained in said annular space.

5. The apparatus of claim 4 wherein said annular space contains an amount of aggregate sufficient to cover the uppermost passage through said tubular member, the size of said aggregate being large enough to be retained in the annular space without passing through said passages in said tubular member.

6. The apparatus of claim 5 which includes an annular pad of filter material which fits around said tubular member and on top of said aggregate material.

7. The apparatus of claim 4 wherein an annular cartridge is adapted to snugly fit onto said outer wall, said annular cartridge having an outer wall and inner wall both concentric to said tubular member, and a foraminous bottom wall extending between and being integral with said inner and outer walls, said annular cartridge being suitable for retaining other filter material, the inner surface of the inner wall snugly contacting the outer surface of said tubular member so that water will flow through said annular cartridge then through said annular space then through said passages to the interior of said tubular member when air is passed through said air delivery means.

8. The apparatus of claim 2 wherein a wall concentric with said tubular member is fitted snugly around the circumference of said base, said wall being about as high as the uppermost passage through said tubular member and being snugly engaged with said base to form an annular space suitable for retaining hard, non-porous aggregate therein.

9. The apparatus of claim 8 wherein an annular cartridge is adapted to snugly fit onto said concentric wall, said annular cartridge having an outer wall and inner wall both concentric to said tubular member, and a foraminous bottom wall extending between and being integral with said inner and outer walls, said additional annular cartridge being suitable for retaining other filter material and said inner surface of the inner wall snugly contacting the outer surface of said tubular member so that water will flow through said additional annular cartridge then through said first annular cartridge then through said passages to the interior of said tubular member when air is passed through said air delivery means.

10. A process for filtering and aerating liquid in a container having a depth of gravel at the bottom of said container which process comprises
    a. placing in said gravel a device which comprises (i) an elongated tubular member which is closed at its lower end, open at the opposite end and provided solely at it lower portion with a plurality of passages through the wall of the tubular member and (ii) an air delivery means for supplying air to the inerior of said tubular member at a point at or slightly below the lowermost level of said passages, whereing said air delivery means comprises an air tube connected to and extending into a chamber designed to allow air to escape from said chamber through passages in the chamber wall, said device being placed in said gravel so that the gravel covers substantially all of the passages, and
    b. passing air through the air delivery means so that the air is discharged parallel to the length of the tubular member in an upward direction and in a direction opposite from the direction said air is delivery to the chambers, to thereby circulate water up said tubular member while it is aerated and water outside said tubular member passes through said gravel and said passages to the interior of said tubular member.

11. The process of claim 10 wherein aerobic bacteria are on said gravel in quantities sufficient to convert ammonia to nitrite and nitrite to nitrate.

12. A process of filtering and aerating liquid in an aquarium which comprises
 a. placing in said aquarium a device which comprises (i) an elongated tubular member which is closed at its lower end, open at the opposite end, and provided at its lower portion with a plurality of passages through the wall of the tubular member, (ii) an air delivery means for supplying air to the interior of said tubular member at a point at or slightly below the lowermost level of said passages so that the air is discharged parallel to the length of said tubular member, (iii) a perpendicular planar wall closing off the lower end of said elongated tubular member and of larger diameter than said tubular member which thereby provides a base supporting means for said apparatus; and (iv) a wall around the circumference of said perpendicular base and about as high as said uppermost passages, said wall being snugly engaged with said planar wall to form an annulus suitable for retaining material in said annulus,
 placing gravel in said annulus, said gravel having aerobic bacteria thereon, and
 passing air through said air delivery means so that said liquid circulates up the elongated tubular member and in through said gravel in said annulus and through said passages to the interior of said enlongated tubular member.

13. A filtration and aeration apparatus which comprises
 a. an elongated tubular member which is closed at its lower end, open at the opposite end, and provided solely at its lower portion with a plurality of passages which extend through the longitudinal wall of the tubular member and
 b. an air delivery means for supplying air to the interior of said tubular member at a level at or slightly below the lowermost of said passages so that the air is discharged in the interior of said tubular member parallel to the length of said tubular member and in an upward direction, said air delivery means comprising (i) an air tube connected to and extending into (ii) a chamber, being defined by an upper substantially planar wall larger than the diameter of the cross-section of the air tube and substantially perpendicular to the length thereof, walls extending substantially perpendicularly downwardly from said upper planar wall and integral therewith, and a lower, substantially planar wall parallel to said upper wall and integral with said side walls, said upper wall having passages extending therethrough and said air tube and chamber being on the interior of said elongated tubular means but removable therefrom.

* * * * *